Patented June 24, 1941

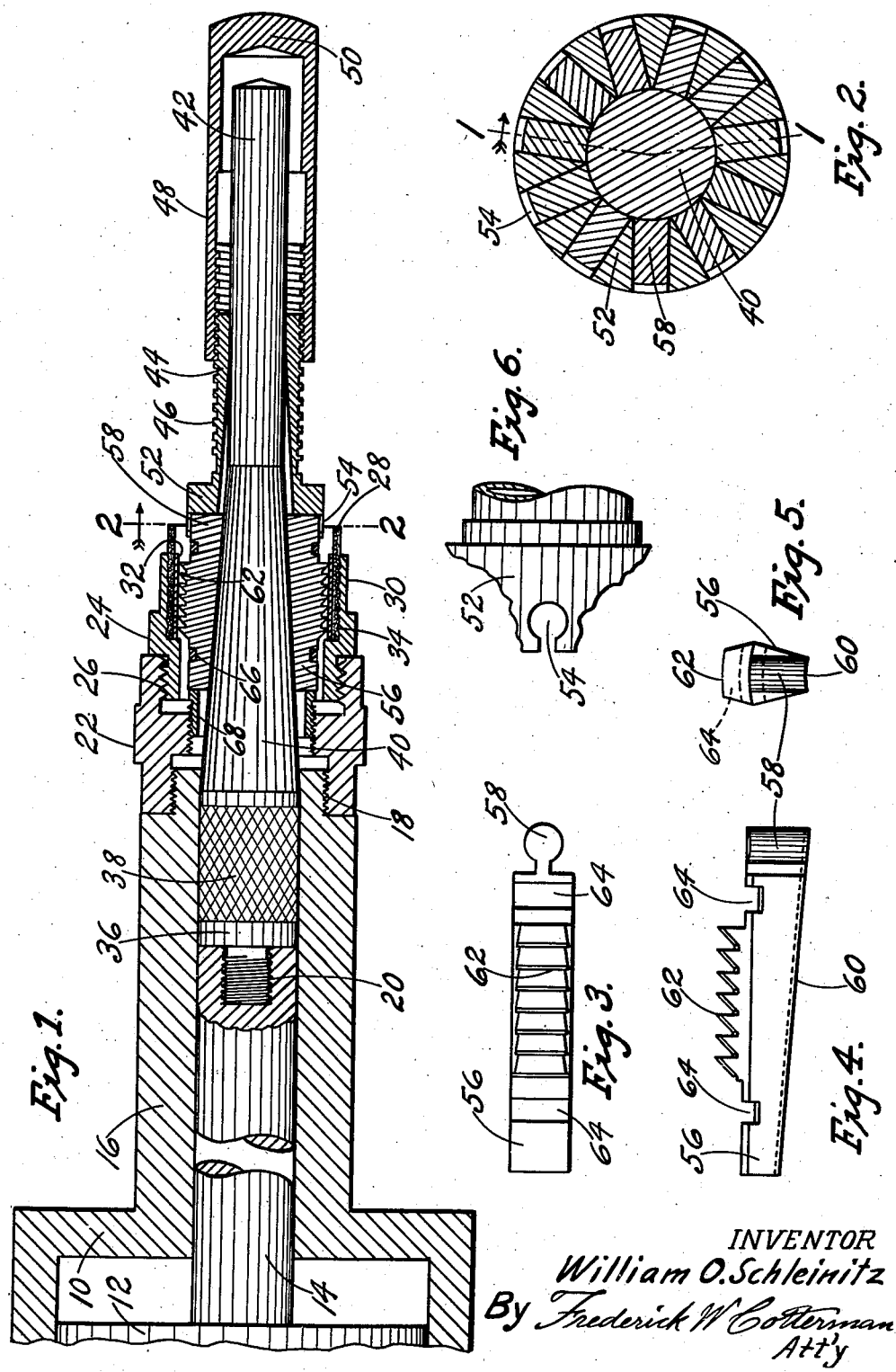

2,246,954

UNITED STATES PATENT OFFICE 2,246,954

EXTRACTOR FOR HOSE COUPLINGS

William O. Schleinitz, Dayton, Ohio

Application November 26, 1938, Serial No. 242,512

3 Claims. (Cl. 29—88.2)

This invention relates to a device for removing the metal couplings from the ends of lengths of fire hose and the like.

In common practice, lengths of fabric hose, universally employed by fire departments, have metal end couplings which must be secured to the hose with pressure tight joints. These couplings are usually threaded, the female on the one end internally for screw connection with a hydrant and the male externally for screw connection into a nozzle. Lengths of hose may, of course, be coupled in series by screwing together a male and female coupling member.

The method generally employed in securing a metal coupling member to the end of a length of fabric hose consists in providing the coupling member with an extension in the form of a sleeve which may slide over the end of the fabric hose, and expanding a length of metal tubing usually called a liner inside of the fabric hose at its end to press the hose outwardly tightly in the sleeve portion of the coupling member, the sleeve portion being provided internally with a series of axially spaced annular ribs to prevent the hose pulling out.

It is not uncommon for a length of hose to break and develop a leak, particularly adjacent its connection to the coupling and this frequently occurs while the coupling member itself is in perfectly good condition. When this does occur, it becomes desirable to remove the coupling member from the damaged hose without damage to the coupling member itself.

Machines are commercially available for expanding the liner in the end of the hose to press the hose outwardly into the internally ribbed coupling sleeve, but up to this time no device is generally known which will easily remove the liner once it is expanded in place, the known practice being to cut the liner with a chisel or similar tool to remove it, which requires great care to prevent injury to the coupling member itself.

It is therefore an object of this invention to provide a mechanism which will grasp the liner which has been expanded in the hose and remove it quickly and easily from the coupling member without damage thereto.

Another object is to so construct the mechanism that it may be operated by the same commercially procurable machine now extensively used for expanding the liner in couplings.

Another object is to provide a device which may be made at low cost yet be of substantial construction and not easily gotten out of order.

Other objects, advantages, and meritorious features will become apparent to those conversant with the art as the invention is described in detail, reference being had to the drawing, wherein, Fig. 1 is an axial section through the device taken as on the line 1—1 of Fig. 2.

Fig. 2 is a transverse section taken on the line 2—2 of Fig. 1 through the radial keys on the ends of the jaws.

Fig. 3 is a top plan view of one of the jaws.

Fig. 4 is a side elevation of one of the jaws.

Fig. 5 is an end elevation of one of the jaws.

Fig. 6 is a fragmentary section showing one of the radial guideways for the jaw keys.

Similar numerals refer to similar parts throughout the several views.

Construction

The commercially known machine now in use for expanding liners into couplings is shown in the drawing more or less schematically, comprising a cylinder 10 with a piston 12, piston rod 14 and piston rod guide 16. Power means for operating the piston in both directions may preferably comprise a hydraulic fluid under pressure with the necessary valves for operating same (not shown). The front end of the piston rod guide 16 is externally threaded at 18 and the piston rod 14 is internally threaded at 20 to receive corresponding threads on the mechanism which is the subject of this invention.

Due to the difference in sizes of coupling members which are to be operated upon and the fact that some of them have male threads and some female, an adapter 22 is provided for each size and style of coupling member which is to be treated.

Adapters 22 all have the one end internally threaded to fit the external threads 18, the other ends being threaded variously, with coarse or fine threads, male or female as required for the coupling member being treated.

In the drawing, a male coupling member 24 is shown with its threads 26 screwed into the adapter. A stub end 28 of fabric hose is still held in the sleeve portion 30 of the coupling member by the expanded liner 32.

The outer wall of the hose is held squeezed into the annular ribs 34 on the inside of the sleeve portion 30 by the liner. The liner must therefore be drawn from the hose stub against the frictional resistance which it encounters because of its tight fit in the hose.

A mandrel 36 has one end threaded to screw closely into the threads 20 of the piston rod. A portion of the mandrel is knurled as at 38 to facilitate screwing the mandrel into the rod. The middle part is tapered as at 40, while the other end portion comprises a long straight pilot 42.

A sleeve 44 is slidable over the pilot 42 and has external threads 46 fitting into the internal threads of a cap 48, the one end of which is closed by the end wall 50. The outside of the cap 48 is preferably knurled to facilitate screwing the cap on to the threads 46 (knurling not shown).

The other end of the sleeve 44 is enlarged to form a head 52, the face of which is provided with a series of radially extending key guides 54, one of which is shown to an enlarged scale in Fig. 6. A series of jaws 56, one of which is shown to an enlarged scale in Figs. 3 to 5 have radially movable keys 58 on the ends of which fit slidably in the guides 54.

The inner surfaces 60 of the jaws 56 are tapered lengthwise and concaved crosswise to fit the tapered portion 40 of the mandrel. The outer surface of the jaws is provided at the middle portion with a series of sharp teeth 62 and near each end with a transverse groove 64 (see Fig. 4).

In the assembled structure Fig. 1 the grooves 64 are each occupied by a heavy rubber band 66 which keeps the jaws closely in contact with the mandrel. A collar 68 is threaded into the adapter and is intended to be screwed in and out axially to properly locate the teeth 62 with respect to the liner 32, should the coupling members being operated upon vary in length.

*Operation*

To remove a coupling member from the end of a leaking hose, the fabric hose is first cut off at a point close up to the coupling. The piston rob 14 is then extended through the guide 16 and the threaded end of the mandrel is screwed into the threads 20 by grasping the mandrel by the knurled part 38.

A proper adapter 22 suited to the coupling is now screwed into the threads 18 of the guide. The coupling 24 with its stub end of hose 28 is screwed into the threads 26 of the adapter. The assembled unit comprising the cap 48 and the sleeve 44 with the head 52 containing the jaws 56 encircled by rubber bands 66 is slipped over the pilot 42 and moved axially thereon until the ends of the jaws 56 encounter the collar 68. If the teeth 62 of the jaws do not all come within the liner 32, the collar 68 is screwed in or out until the teeth are properly placed in the liner.

Hydraulic fluid under very low pressure is now turned into cylinder 10 to force the piston 12 forwardly until the tapered part 40 of the mandrel forces the jaws 56 outwardly until the teeth 62 all touch the inside surface of the liner. Because of the fact that low pressure only is applied to the piston, the piston stops moving when the teeth touch the inside of the liner.

The cap 48 is now screwed forward until the end wall 50 touches the end of the pilot 42. It is then unscrewed about one fourth turn. This will leave a space between the end of the pilot and the wall 50 of about one-sixteenth inch more or less.

Hydraulic fluid under heavy pressure is now applied to the piston 12. The first one-sixteenth inch movement of the mandrel 36 will imbed each of the sharp edges of the teeth 62 in the inner surface of the liner 32 to a depth of approximately .005 inch by which time the end of the mandrel will strike the wall 50, whereupon no further expansion of the jaws 56 may occur.

Since, however, there is a heavy hydraulic pressure back of the piston 12, the mandrel 36 will move forward, pushing the cap 48 with it. The cap 48 will now draw the sleeve 44 and jaws 56 with it, thereby pulling the liner 32 out of the stub of hose 28, after which the stub is easily removed from the coupling member by hand.

It will of course be understood that the figures of one-quarter turn or one-sixteenth inch for backing off the cap 48, and the amount of .005 inch as the depth which the teeth 62 will imbed in the liner 32 are arbitrary and given for illustrative purposes only. Other changes in structure coming within the spirit of the invention are intended to be embraced within the scope of the appended claims.

I claim:

1. The combination, in a machine for removing liners from hose couplings, of a press having a stationary portion and a movable part, an axially movable mandrel secured to said movable part, said mandrel having a tapered portion intermediate its ends, a chuck body slidable axially over said mandrel, radial guideways in said body, radially movable chuck jaws having guides in said guideways, sharp teeth on the outside of said jaws, said jaws having tapered inner surfaces bearing on the tapered portion of the mandrel, a coupling holder secured to said stationary portion positioned for holding a coupling with the liner surrounding said teeth, an externally threaded hollow shank on said chuck body, an internally threaded cap axially adjustable by screwing it endwise over said shank, said cap having the one end closed and adapted to intercept the end of the mandrel and stop relative movement between the mandrel and the chuck body when the teeth are sufficiently imbedded in the liner, said movable part being adapted for forcing said mandrel axially with respect to the chuck body and jaws until the end of the mandrel encounters the closed end of the cap and thereafter forcing both mandrel and chuck body together with respect to said holder to thereby remove said liner.

2. The combination, in a device of the character described, of a press having a stationary portion and a movable part, a mandrel secured to the movable part and movable axially thereby, said mandrel having a tapered portion intermediate its ends, a chuck body slidable over the mandrel, said body comprising a hollow externally threaded shank and a hollow head of larger diameter, there being radial guideways in the face of said head, chuck jaws having guides movable radially in said guideways, a series of sharp teeth on the outside of each of said jaws, said jaws having tapered inner surfaces conforming to, and resting upon, the tapered portion of the mandrel, an internally threaded cap with closed end screwed over the end of the chuck body shank and adjustable axially by said threads with respect to said body, a coupling holder secured to said stationary portion of said press and positioned for holding a coupling with the liner surrounding said teeth, and power means associated with said press for actuating said movable part and thereby first forcing said mandrel axially with its tapered portion acting against the tapered surfaces of said jaws until the sharp teeth are slightly imbedded in the liner, the cap being then adjusted so the end of the mandrel will strike the closed end of the cap at the instant the teeth are sufficiently imbedded, and thereafter by continuing the actuation of said movable part to cause additional axial movement of said mandrel, forcing said chuck body and jaws axially until the liner is withdrawn from the coupling.

3. The structure defined in claim 2 with axially adjustable means on the coupling holder for abutting the ends of the chuck jaws and positioning them axially with respect to the coupling member so the teeth will all engage the liner.

WILLIAM O. SCHLEINITZ.